United States Patent Office 3,074,917
Patented Jan. 22, 1963

3,074,917
REACTION OF POLYMER HAVING TERMINALLY REACTIVE ACIDIC GROUPS AND AN AZIRIDINYL PHOSPHINE OXIDE OR SULFIDE
William B. Reynolds, Bartlesville, Okla., assignor to Phillips Petroleum Company, a corporation of Delaware
No Drawing. Filed May 28, 1959, Ser. No. 816,361
13 Claims. (Cl. 260—85.1)

This invention relates to new and useful polymer compositions and method for their preparation. In one aspect the invention relates to solid polymer materials prepared by reacting terminally reactive polymers with a tri(aziridinyl)phosphine oxide or tri(aziridinyl)phosphine sulfide.

As used herein, the term "terminally reactive polymer" designates polymer which contains a reactive group at each end of the polymer chain. The term "monoterminally reactive polymer" designates polymer which contains a reactive group only at one end of the polymer chain.

It is an object of this invention to provide new and useful polymeric materials and methods for their preparation.

Another object of this invention is to provide new and useful polymer products by reacting polymers containing terminal acidic groups with a tri(aziridinyl)phosphine oxide or a tri(aziridinyl)phosphine sulfide.

Still another object of this invention is to provide new and useful solid polymer compositions from liquid and semi-solid polymers containing terminal acidic groups.

Yet another object of this invention is to provide new and useful polymer produces of increased molecular weight.

These and other objects of the invention will become more readily apparent from the following detailed description and discussion.

The foregoing objects are realized broadly by reacting a polymer containing terminal acidic groups with a reactant selected from the group consisting of tri(aziridinyl)phosphine oxides and tri(aziridinyl)phosphine sulfides and recovering a polymer product of increased molecular weight.

In one aspect of the invention, polymers containing terminal alkali metal atoms are reacted to replace said atoms with acidic groups and the resultant polymers are reacted with the tri(aziridinyl)phosphine oxide or tri(aziridinyl)phosphine sulfide.

It has now been discovered that new and useful polymer compositions can be prepared by polymerizing polymerizable monomers to liquid or semisolid polymers which contain alkali metal atoms at the end of the polymer chain and double bonds within the polymer chain, replacing the alkali metal atom with acidic groups and converting the polymers to solid polymers of higher molecular weight by reacting the polymers with tri(aziridinyl)phosphine oxides or sulfides. Polymer compositions ranging from soft materials to hard, tightly cured polymers can be obtained, depending upon the molecular weight of the polymer containing the terminal acidic groups and the quantity of tri(aziridinyl)phosphine oxide or sulfide employed.

The monomers which can be employed in the preparation of polymers containing terminal alkali metal atoms include a wide variety of materials. The preferred monomers are the conjugated dienes containing from 4 to 12 carbon atoms and preferably 4 to 8 carbon atoms, such as 1,3-butadiene isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employed are aryl-substituted olefins, such as styrene, various alkyl styrenes, paramethoxystyrene, vinylnaphthalene, vinyl-toluene, and the like; heterocyclic nitrogen-containing monomers, such as pyridine and quinoline derivatives containing at least 1 vinyl or alphamethylvinyl group, such as 2-vinylpyridine, 3-vinylpyridine, 4-vinylpyridine, 3-ethyl-5-vinylpyridine, 3-methyl-5-vinylpyridine, 3,5-diethyl-4-vinylpyridine, etc.; similar mono- and di-substituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers and copolymers of the above materials also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing terminal reactive groups and their method of preparation is set forth in the copending application of R. P. Zelinski, Serial No. 796,277, filed March 2, 1959 This application describes a proces for preparing block copolymers from monomers included in the following groups: (1) 1,3-butadiene, 2-methyl-1,3-butadiene, 1,3-pentadiene and vinyl-substituted aromatic hydrocarbons, (2) vinylpyridines and (3) vinyl halides, vinylidene halides, acrylonitrile, esters of acrylic acid and esters of homologues of acrylic acid. The process comprises the steps of initially contacting a monomer selected from those included in groups (1) and (2) with an organolithium compound in the presence of a diluent selected from the group consisting of aromatic, paraffinic and cycloparaffinic hydrocarbons so as to form a polymer block; and, after polymerization of substantially all of the selected monomer, contacting the aforementioned catalyst in the presence of the polymer block initially formed and the hydrocarbon diluent with a monomer selected from those included in groups (1), (2) and (3) when the initial monomer is selected from group (1) and with a monomer selected from those included in group (3) when the initial monomer is selected from group (2), the monomer selected being different from the monomer employed in the initial contacting.

The terminally reactive polymers are prepared by contacting the monomer or monomers which it is desired to polymerize with an organo polyalkali metal compound. The organo polyalkali metal compounds preferably contain from 2 to 4 alkali metal atoms, and those containing 2 alkali metal atoms are more often employed. As will be explained hereinafter, lithium is the preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkali metal atoms being attached at each end of the polymer chain. The polymers in general will be linear polymers having two ends; however, polymers containing more than two ends can be prepared within the scope of the invention. The general reaction can be illustrated graphically as follows:

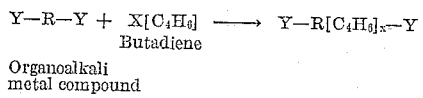

or

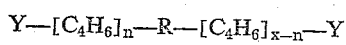

or combinations thereof.

A specific example is:

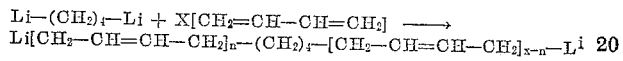

In the specific example 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course, include sodium, potassium, lithium, rubidium, and cesium. The organic radical of the organo polyalkali metal compound can be an aliphatic, cycloaliphatic or aromatic radical. For example, di- and polyalkali metal substituted hydrocarbons can be employed including 1,4-dilithiobutane,
1,5-dipotassiopentane,
1,4-disodio-2-methylbutane,
1,6-dilithiohexane,
1,10-dilithiodecane,
1,15-dipotassiopentadecane,
1,20-dilithioeicosane,
1,4-disodio-2-butene,
1,4-dilithio-2-methyl-2-butene,
1,4-dilithio-2-butene,
1,4-dipotassio-2-butene,
dilithionaphthalene,
disodionaphthalene,
4,4'-dilithiobiphenyl,
disodiophenanthrene,
dilithioanthracene,
1,2-dilithio-1,1-diphenylethane,
1,2-disodio-1,2,3-triphenylpropane,
1,2-dilithio-1,2-diphenylethane,
1,2-dipotassiotriphenylethane,
1,2-dilithiotetraphenylethane,
1,2-dilithio-1-phenyl-1-naphthylethane,
1,2-dilithio-1,2-dinaphthylethane,
1,2-disodio-1,1-diphenyl-2-naphthylethane,
1,2-dilithiotrinaphthylethane,
1,4-dilithiocyclohexane,
2,4-disodioethylcyclohexane,
3,5-dipotassio-n-butylcyclohexane,
1,3,5-trilithiocyclohexane,
1-lithio-4-(2-lithiomethylphenyl)butane,
1,2-dipotassio-3-phenylpropane,
1,2-di(lithiobutyl)benzene,
1,3-dilithio-4-ethylbenzene,
1,4-dirubidiobutane,
1,8-dicesiooctane,
1,5,12-trilithiododecane,
1,4,7-trisodioheptane,
1,4-di(1,2-dilithio-2-phenylethyl)-benzene,
1,2,7,8-tetrasodionaphthalene,
1,4,7,10-tetrapotassiodecane,
1,5-dilithio-3-pentyne,
1,8-disodio-5-octyne,
1,7-dipotassio-4-heptyne,
1,10-dicesio-4-decyne,
1,11-dirubidio-5-hendecyne,
1,2-disodio-1,2-diphenylethane,
dilithiophenanthrene,
1,2-dilithiotriphenylethane,
dilithiomethane,
1,4-dilithio-1,1,4,4-tetraphenylbutane,
1,4-dilithio-1,4-diphenyl-1,4-dinaphthylbutane, and the like.

While the organo dialkali metal initiators in general can be employed, certain specific initiators give better results than others and are preferred in carrying out the preparation of the terminally reactive polymers. For example, of the condensed ring aromatic compounds the lithium-naphthalene adduct is preferred, but the adducts of lithium with anthracene and biphenyl can be employed with good results. Of the compounds of alkali metals with polyaryl-substituted ethylenes, the preferred material is 1,2-dilithio-1,2-diphenylethane (lithium-stilbene adduct). In many instances the compounds which are formed are mixtures of mono- and dialkali metal compounds, which are less effective in promoting the formation of the terminally reactive polymers. The organo dialkali metal compounds, which have been set forth as being preferred, are those which when prepared contain a minimum of the monoalkali metal compound.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers prepared as hereinbefore set forth contain an alkali metal atom on each end of the polymer chain and the organic radical of the initiator is present in the polymer chain. These terminally reactive polymers are treated with suitable reagents such as carbon dioxide, sulfuryl chloride, etc., and upon hydrolysis provide polymers containing terminal acidic groups. The acidic groups include groups such as SOH, $SO_2H$, $SO_3H$, COOH, $SeO_2H$, $SeO_3H$, $SiO_2H$, $SnO_2H$, $SbO_2H$, SbOH, $SbO_3H_2$, $TeO_2H$, $TeO_3H$, $AsO_2H$, AsOH, $AsO_3H_2$, $AsO_3H_3$. Reaction of terminally reactive polymer containing alkali metal atoms with the acid forming reagents can be carried out over a wide range of temperatures, e.g., $-75°$ C. to $+75°$ C., and preferably utilizing an amount of reagent in excess of stoichiometric. The following reactions present examples of specific methods which can be employed to introduce the terminal acidic groups. In these equations, A designates a polymer chain.

(1)

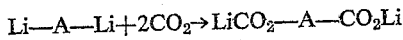

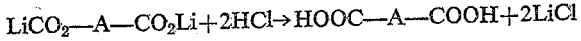

(2)

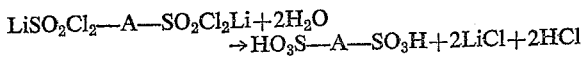

In accordance with the invention, the polymers containing terminal acidic groups are further reacted with a tri(aziridinyl)phosphine oxide or sulfide. The reactants employed in this operation can be represented by the formula

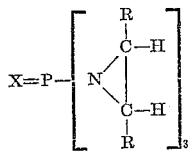

wherein X is selected from the group consisting of oxygen and sulfur, P is phosphorus, the R's are radicals containing up to a total of 20 carbon atoms selected from the group consisting of hydrogen, alkyl, cycloalkyl, aryl, alkaryl, and aralkyl radicals, and the R's can be alike or unlike.

The following example illustrates one reaction which is believed to occur.

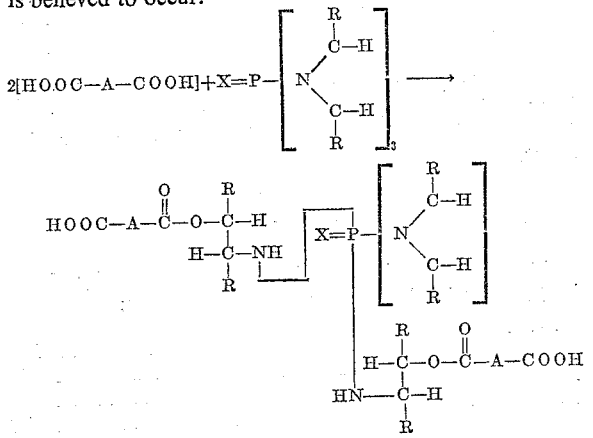

Specific phosphine reactants which can be employed include tri(1-aziridinyl)phosphine oxide,
tri(2-methyl-1-aziridinyl)phosphine oxide,
tri(2,3-dimethyl-1-aziridinyl)phosphine oxide,
tri(2-isopropyl-1-aziridinyl)phosphine oxide,
tri(2-methyl-3-ethyl-1-aziridinyl)phosphine oxide,
tri(2-isopropyl-1-aziridinyl)phosphine oxide,
tri(2-methyl-3-n-butyl-1-aziridinyl)phosphine oxide,
tri(2-hexyl-1-aziridinyl)phosphine oxide,
tri(2,3-diheptyl-1-aziridinyl)phosphine oxide,
tri(2-methyl-3-octyl-1-aziridinyl)phosphine oxide,
tri(2-ethyl-3-decyl-1-aziridinyl)phosphine oxide,
tri(2-dodecyl-1-aziridinyl)phosphine oxide,
tri(2-methyl-3-tridecyl-1-aziridinyl)phosphone oxide,
tri(2-ethyl-3-octadecyl-1-aziridinyl)phosphine oxide,
tri(2-eicosyl-1-aziridinyl)phosphine oxide,
tri(2-methyl-3-cyclopentyl-1-aziridinyl)phosphine oxide,
tri(2-ethyl-3-cyclohexyl-1-aziridinyl)phosphine oxide,
tri[2-n-butyl-3(4-methylcyclohexyl)1-aziridinyl]phosphine oxide,
tri(2-phenyl-1-aziridinyl)phosphine oxide,
tri(2-phenyl-3-tetradecyl-1-aziridinyl)phosphine oxide,
tri(2,3-diphenyl-1-aziridinyl)phosphine oxide,
tri(2-tert-butyl-3-phenyl-1-aziridinyl)phosphine oxide,
tri[2-ethyl-3-(1-naphthyl)1-aziridinyl]phosphine oxide,
tri[2-n-propyl-3-(2-naphthyl)1-aziridinyl]phosphine oxide,
tri(2-methyl-3-benzyl-1-aziridinyl)phosphine oxide,
tri(2-nonyl-3-benzyl-1-aziridinyl)phosphine oxide,
tri[2-n-propyl-3-(2-phenylethyl)1-aziridinyl]phosphine oxide,
tri[2methyl-3-(4-methylphenyl)1-aziridinyl]phosphine oxide,
tri[2-ethyl-3-(3-n-propylphenyl)1-aziridinyl]phosphine oxide,
tri[2-heptyl-3-(2,4-dimethylphenyl)1-aziridinyl]phosphine oxide,
tri(1-aziridinyl)phosphine sulfide,
tri(2-methyl-1-aziridinyl)phosphine sulfide,
tri(2,3-dimethyl-1-aziridinyl)phosphine sulfide,
tri(2,3-diethyl-1-aziridinyl)phosphine sulfide,
tri(2-methyl-3-isopropyl-1-aziridinyl)phosphine sulfide,
tri(2-tert-butyl-1-aziridinyl)phosphine sulfide,
tri(2,3-didecyl-1-aziridinyl)phosphine sulfide,
tri(2-ethyl-3-pentadecyl-1-aziridinyl)phosphine sulfide,
tri(2-eicosyl-1-aziridinyl)phosphine sulfide,
tri(2-methyl-3-cyclohexyl-1-aziridinyl)phosphine sulfide,
tri(2-phenyl-1-aziridinyl)phosphine sulfide,
tri(2-phenyl-3-benzyl-1-aziridinyl)phosphine sulfide,
tri(2,3-diphenyl-1-aziridinyl)phosphine sulfide,
tri(2-ethyl-3-phenyl-1-aizridinyl)phosphine sulfide,
tri(2-amyl-3-benzyl-1-aziridinyl)phosphine sulfide.

The phosphine reactant can be added to or incorporated in the polymer in the same manner employed in adding conventional additives or reactants to rubbery or plastic materials, for example by combining the materials in a roll mill or by the use of a Banbury mixer. Reaction of the polymer with the phosphine reactant can be carried out over a wide range of temperatures, for example from about 100° F. to as high as 500° F., with the preferred reaction temperature being between about 200° F. and about 400° F. The reaction time can vary over a period ranging from as low as two minutes to as high as 24 hours or longer. The quantity of phosphine reactant employed is preferably at least a stoichiometric amount, i.e., at least one mol per mol equivalent of acidic group in the polymer. It is within the scope of the invention, however, to use either lesser or greater amounts of reactant, depending on the degree of reaction or curing desired. Various types of compounding ingredients, including fillers such as carbon black and mineral fillers, can be incorporated in the polymer containing terminal acidic groups prior to reaction of the polymer with the phosphine reactant.

The invention provides a method for converting liquid, semisolid, and solid polymers to vulcanized rubbery and cross-linked plastic products. A wide variety of polymer compositions which are obtained when operating in accordance with the present invention include materials which are suitable as adhesives, potting compounds, tread stocks, and also for the manufacture of many types of molded objects. Polymers which contain unreacted terminal acidic groups adhere to metal surfaces. Thus, partially reacted or cured polymers are valuable for use in metal adhesive compositions. They can also be used in the production of laminates in which one or more of the plies are metals.

The following examples are presented in illustration of the invention.

*Example I*

1,2-dilithio-1,2-diphenylethane was prepared in accordance with the following recipe:

Diethyl ether,a ml _____ 600
Tetrahydrofuran,b ml _____ 60
Trans-Stilbene, grams _____ 27
Lithium wire, grams _____ 5.2 a Dried over sodium.
b Refluxed and distilled from lithium aluminum hydride.

The reaction was effected in an atmosphere of prepurified nitrogen. Conversion was quantitative over a period of one hour at 122° F.

The 1,2-dilithio-1,2-diphenylethane was used as the initiator for the polymerization of butadiene in accordance with the following recipe:

Butadiene, parts by weight _____ 100
Toluene, parts by weight _____ 864
1,2-dilithio-1,2-diphenylethane, millimoles _____ 40
Temperature, ° F _____ 122
Time, hours _____ 1
Conversion, percent _____ (1)

1 Quantitative.

Polymerization was effected in a 2-liter reactor. The butadiene employed was special purity grade which was distilled and the gaseous material was dried by passing it through ethylene glycol before it was condensed. The toluene was dried over silica and alumina and then bubbled in gallon lots with prepurified nitrogen for 30 minutes at the rate of 3 liters per minute. For the polymerization, toluene was charged first after which prepurified nitrogen was passed through it for five minutes at the rate of 3 liters per minute. 1,2-dilithio-1,2-diphenylethane was then added, the mixture was heated to 70° C. (158° F.) while a vacuum pump was used to remove ether and tetrahydrofuran, and the butadiene was introduced last. After a 1-hour polymerization period at 122° F., the unquenched reaction mixture was carbonated using a T-tube. The polymer solution and carbon dioxide were fed into separate arms of the tube where they were mixed and passed through the other arm of the tube which was dipped into a mixture of toluene and Dry Ice. A gelatinous mass formed which became fluid upon acidification with hydrochloric acid. The polymer was coagulated with isopropanol, washed with isopropanol containing a small amount of phenyl-beta-naphthylamine, and then dried in a vacuum oven. A liquid product was obtained which had an inherent viscosity of 0.2 and was gel free. It had a carboxy content of 1.4 weight percent.

Four-gram samples of the carboxy-containing polymer were treated with variable amounts of tri(2-methyl-1-aziridinyl)phosphine oxide and each composition was cured 5 days at 160° F. The inherent viscosity (on the soluble portion), gel, and swelling index were determined on each cured sample. Results were as follows:

| Sample | Polymer, grams | Tri(2-methyl-1-aziridinyl) phosphine oxide | Inherent viscosity 1 | Gel, percent 2 | Swelling index 3 | Remarks |
|---|---|---|---|---|---|---|
| 1 | 4 | 0.1 | 0.60 | 57 | 29 | Total product was a solid; soluble portion was semi-solid. |
| 2 | 4 | 0.15 | 0.34 | 72 | 15 | Total product was a solid; soluble portion was a viscous liquid. |
| 3 | 4 | 0.2 | 0.25 | 65 | 41 | Total product was a solid; soluble portion was a liquid. |
| 4 | 4 | 0.3 | 0.40 | 41 | 46 | Total product was a solid; soluble portion was semi-solid. |

1 One-tenth gram of polymer was placed in a wire cage made from 80-mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
2 Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the bottle was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration. The cage, after removal from the two-ounce bottle, was placed in an aluminum weighing dish of known weight and the cage and dish were placed in a vacuum drying oven at 70–80° C. for one hour after which they were allowed to cool to room temperature and weighed. Subtracting the sum of the weights of the aluminum dish and the cage from the latter weighing gave the weight of the gel which was finally corrected for solution retention on the cage and for soluble polymer remaining within the gel structure.
3 This determination was made along with the gel determination. Swelling index is calculated by dividing the weight of swelled gel by the weight of dry gel.

These data show that liquid polymers containing carboxy end groups can be cured to solid products using tri(2-methyl-1-aziridinyl)phosphine oxide as a curing agent.

*Example II*

1,2-dilithio-1,2-diphenylethane was prepared by charging the following ingredients to a quart reactor:

Diethyl ether, ml _____ 550
Tetrahydrofuran, ml _____ 50
Trans-Stilbene, grams _____ 18
Lithium wire, grams _____ 2.8

The reaction was effected in a nitrogen atmosphere at room temperature (about 23–25° C.) for a period of 18–20 hours. The solution was 0.151 molar.

Butadiene was polymerized using the 1,2-dilithio-1,2-diphenylethane as the initiator. The polymerization recipe was as follows:

| | |
|---|---:|
| Butadiene, parts by weight | 100 |
| Cyclohexane, parts by weight | 1500 |
| 1,2-dilithio-1,2-diphenylethane, millimoles | 1.9 |
| Temperature, °F | 122 |
| Time, hours | 1.5 |
| Conversion, percent | 79 |

Polymerization was effected in a quart bottle. The cyclohexane (dried in the manner described for toluene in Example I) was charged first after which prepurified nitrogen was passed through it for 5 minutes at the rate of 3 liters per minute. Butadiene was added followed by the 1,2-dilithio-1,2-diphenylethane. After a polymerization period of 1.5 hours, the reaction mixture was treated with carbon dioxide as described in Example I. A rubbery carboxy-containing product was recovered which had the following properties:

| | |
|---|---:|
| Inherent viscosity [1] | 2.49 |
| Gel, percent [2] | 3 |
| Swelling index [3] | 91 |
| Mooney value (ML–4 at 212° F.) [4] | 44 |
| Carboxy content, weight percent [5] | 0.055 |

[1] Same as in Example I.
[2] Same as in Example I.
[3] Same as in Example I.
[4] Determined by ASTM D927–55T.
[5] Determined by dissolving one gram of the polymer, weighed accurately, in 50 milliliters of pyridine and titrating the resulting solution for acid with a 0.01 N benzene-methanol solution of sodium methoxide to the thymol blue end point. The benzene-methanol mixture was prepared from 1500 milliliters of benzene and 250 milliliters of methanol.

Tri(2-methyl-1-aziridinyl)phosphine oxide (0.05 gram) was incorporated into 5 grams of the carboxy-containing polymer and the mixture was cured 30 minutes at 307° F. A highly crosslinked product which contained 96 percent gel and resembled a vulcanized rubber was obtained.

*Example III*

Liquid polybutadiene was prepared in the presence of 1,2-dilithio-1,2-diphenylethane as the initiator and then carbonated to give a product having a carboxy content of 2.37 percent. This liquid was compounded in two recipes as follows:

| | Parts by weight | |
|---|---:|---:|
| | A | B |
| Carboxy-containing polymer | 100 | 100 |
| Carbon black (Philblack O) | 50 | 50 |
| Tri(2-methyl-1-aziridinyl)-phosphine oxide | 3 | 8 |

The compositions were cured 40 minutes at 307° F. They were free flowing before curing. After curing they set up to a putty-like consistency.

Having thus described the invention by providing specific examples thereof, it is to be understood that no undue limitations or restrictions are to be drawn by reason thereof and that many variations and modifications are within the scope of the invention.

I claim:

1. A process which comprises mixing a terminally reactive polymer having the formula $AY_n$ wherein A comprises a polymer of polymerizable vinylidene compound, Y is a terminal acidic group, and n is an integer of at least 2, said polymer having been prepared by polymerizing vinylidine compounds in the presence of an organo polyalkali metal compound to produce a polymer containing terminal alkali metal atoms and subsequently replacing said alkali and metal atoms with acidic groups, with a reactant material having the formula

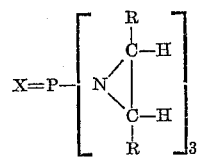

wherein X is selected from the group consisting of oxygen and sulfur, each R is selected from the group consisting of hydrogen, alkyl, cycloalkyl, aryl, aralkyl, and alkaryl radicals and both R's contain up to 20 carbon atoms, and reacting the thus formed mixture at elevated temperature to produce a polymer product of increased molecular weight.

2. A process which comprises mixing a conjugated diene polymer containing at least 2 terminal carboxy groups, said polymer having been prepared by polymerizing a conjugated diene in the presence of an organo polyalkali metal compound to produce a polymer containing terminal alkali metal atoms and subsequently replacing said alkali metal atoms with carboxy groups, with a reactant material having the formula

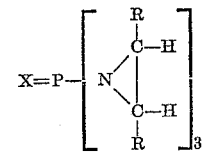

wherein X is selected from the group consisting of oxygen and sulfur, each R is selected from the group consisting of hydrogen, alkyl, cycloalkyl, aryl, aralkyl, and alkaryl radicals and both R's contain up to 20 carbon atoms, and reacting the thus formed mixture at about 100 to 500° F. to produce a polymer product of increased molecular weight.

3. A process which comprises mixing a polymer of a conjugated diene having from 4 to 12 carbon atoms, said polymer having carboxy groups on each end of the polymer molecule and having been prepared by polymerization of the conjugated diene in the presence of an organo polyalkali metal compound to produce a polymer containing terminal alkali metal atoms and subsequently replacing said alkali metal atoms with carboxy groups, with at least about a stoichiometric amount of tri(2-methyl-1-aziridinyl)phosphine oxide, and reacting the resulting mixture at about 100 to 500° F. for about 2 minutes to 24 hours to form a polymer product of increased molecular weight.

4. The process of claim 3 wherein said polymer is a liquid and said polymer product is a solid.

5. The composition prepared in accordance with the process of claim 1.

6. The process of claim 1 in which the polymer is a polymer of butadiene and the reactant material is tri(2-methyl-1-aziridinyl)phosphine oxide.

7. The composition prepared in accordance with the process of claim 6.

8. The composition prepared in accordance with the process of claim 3.

9. The process of claim 3 in which the polymer is a polymer of butadiene.

10. The process of claim 3 in which the polymer is a polymer of isoprene.

11. The process of claim 3 in which the polymer is a copolymer of butadiene and styrene.

12. The process of claim 1 in which the polymer is a homopolymer of butadiene, the reactant material is tri(2-methyl-1-aziridinyl)phosphine oxide, the acidic group is a carboxyl group and reaction of the polymer with the reactant material is carried out at a temperature in the range of about 100 to about 500° F.

13. The process of claim 1 in which the polymer is a homopolymer of butadiene, the reactant material is tri(2-methyl-1-aziridinyl)phosphine oxide, the acidic groups are sulfuryl groups and reaction of the polymer with the reactant material is carried out at a temperature of about 100 to about 500° F.

References Cited in the file of this patent

UNITED STATES PATENTS

| | | |
|---|---|---|
| 2,606,902 | Parker et al. | Aug. 12, 1952 |
| 2,631,175 | Crouch | Mar. 10, 1953 |
| 2,662,874 | Brown | Dec. 15, 1953 |
| 2,906,592 | Reeves et al. | Sept. 29, 1959 |
| 2,915,480 | Reeves et al. | Dec. 1, 1959 |
| 2,933,416 | Haakh et al. | Apr. 19, 1960 |